D. J. GEORGE.
Domestic Oven.
No. 106,352. Patented Aug. 16, 1870
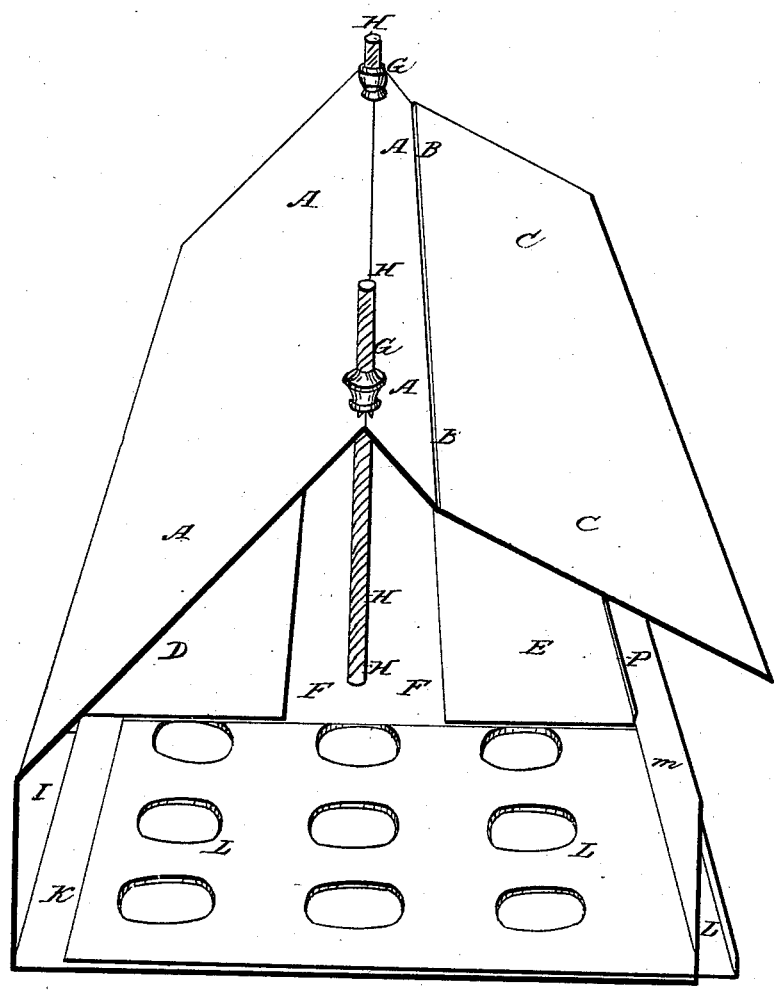
Witnesses:
E. H. Cowles
[signature]
Inventor:
David J. George
by C. E. McDonald his attorney

United States Patent Office.

DAVID J. GEORGE, OF ARCADE, INDIANA.

Letters Patent No. 106,352, dated August 16, 1870.

IMPROVEMENT IN OVENS.

The Schedule referred to in these Letters Patent and making part of the same

*To all whom it may concern:*

Be it known that I, DAVID J. GEORGE, of Arcade, in the county of Hamilton and in the State of Indiana, have invented an Improvement in Ovens; and I do hereby declare that the following is a full, clear, and exact description thereof, reference being had to the accompanying drawing, and to the figures and letters of reference marked thereon.

The nature of the invention consists in the construction and use of the oven hereinafter described, said device to be made of sheet-tin, or any other convenient and suitable sheet metal.

To enable others skilled in the art to make and use my said invention, I proceed to describe it more fully, as follows, viz:

It consists of an oblong box, of the shape represented in the drawing.

A A is the top.

C C, a lid, which, when closed on the side M, forms a part of the top.

L and M are the two upright sides.

K L L, the bottom.

The bottom is made of two pieces, which are both perforated as represented in the drawing, and slide on one another, for the purpose of closing off the heat and letting it on.

F is a swinging partition, the height of which is regulated by the nuts G, which work on the screws H.

D and E are slides, which work upon the said F to adjust its breadth.

This oven is to be placed upon the top of the stove. The bread, pies, cakes, &c., to be baked are to be introduced through the door C C, which is then closed. By sliding out L L in the direction of O, it can be moved far enough to open the perforations entirely, and so let in a large amount of heat.

If the heat is too great, it may be abated by slipping L in the direction of I, in which direction it will move far enough to close the holes entirely. The heat may be further regulated by elevating F; as F is raised the heat decreases, and as it is lowered, increases.

When the articles have been baked they may be taken out as they were put in, through the door C C.

What I claim, and desire to secure by Letters Patent, is—

The oven herein described, when the same is constructed with the top A A, the lid C C, the screws H, and the nut G, the hanging partition F, and its adjustable slides D and E, the bottoms L and K, when constructed and used in manner and form substantially as set forth.

In testimony that I claim the foregoing specification, I have hereunto set my hand this 8th day of May, 1869.

DAVID J. GEORGE.

Witnesses:
GEORG G. F. BOSWELL,
OTTO BOETTICHER.

*Assignor to himself, Mary R. George & George G. (G.?) Boswell*